Figure 1:
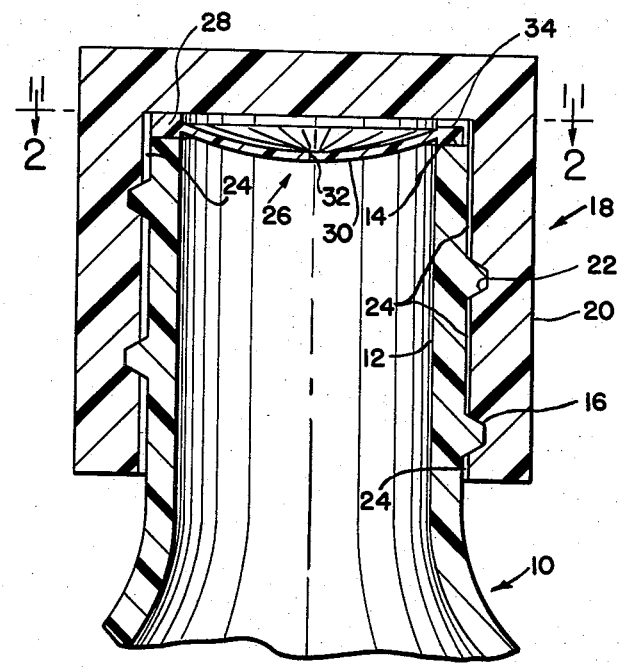

Feb. 27, 1962   J. W. SMITH, JR   3,022,918
SEALING MEANS
Filed June 13, 1960

INVENTOR.
JOHN W. SMITH, JR.
BY
FINN G. OLSEN
ATTORNEY

United States Patent Office 3,022,918
Patented Feb. 27, 1962

3,022,918
SEALING MEANS
John W. Smith, Jr., Tecumseh, Mich., assignor, by mesne assignments, to Plas-Tainer Inc., Saline, Mich., a corporation of Michigan
Filed June 13, 1960, Ser. No. 35,671
5 Claims. (Cl. 215—56)

The present invention relates to sealing means for containers and particularly to collapsible plastic bottles adapted to carry liquid contents which have an affinity for oxygen or the like whereby reduced pressures may occur within the bottles if chemical reactions occur with elements of the air.

There has been a rapid trend in recent years toward the use of blown plastic bottles for use in the sale and distribution of many goods which formerly sold in more rigid containers formed of glass or metal. The cost of the materials used in manufacturing the plastic bottles represents a major portion of the cost of such bottles, and therefore, it is necessary to make them with relatively thin walls if they are to be sold competitively with glass or metal containers. Because of the flexible character of the finished product, the bottles will more readily collapse if pressures on the outside of the bottles exceed those on the inside than is the case when using more rigid materials.

One of the significant problems faced by manufacturers of blown plastic bottles has arisen in connection with contents for such bottles which have an affinity for oxygen. Under these circumstances, it is found that such air as is in the bottles after the same have been filled and sealed will combine with the liquid contents of the bottles thereby reducing the pressure within the sealed bottles. The result is that the bottles will partially collapse. Obviously, this is undesirable for a number of reasons and leaves the bottles with a very undesirable appearance. Normally this condition cannot be corrected except by opening the caps of the bottles which is an impractical or sometimes impossible step for the distributor to perform.

It is the principal object of the present invention to provide sealing means for use with a plastic bottle and cap wherein an effective seal is provided which will prevent leakage of liquid contents from the bottle and which will allow air to enter the bottle if the pressure within the bottle is reduced below that of the surrounding atmosphere.

It is another object of the present invention to provide sealing means of the foregoing character which is characterized by its simple construction and low cost.

It is still another object of the present invention to provide a sealing means of the foregoing character which is constructed and arranged so that the "breathing" permitted is automatically performed.

It is still another object of the present invention to provide a sealing means of the foregoing character which automatically utilizes the relative differences in fluid pressures that may exist on the inside and outside of the bottle to open and close a breathing aperture at the appropriate times to prevent relatively low pressures from existing within such bottle and to maintain such aperture closed when the pressure inside the bottle is equal to or greater than the surrounding atmospheric pressure.

Other objects of this invention will appear in the following description and appended claims, reference being had to the accompanying drawings forming a part of this specification wherein like reference characters designate corresponding parts in the several views.

Figure 2:
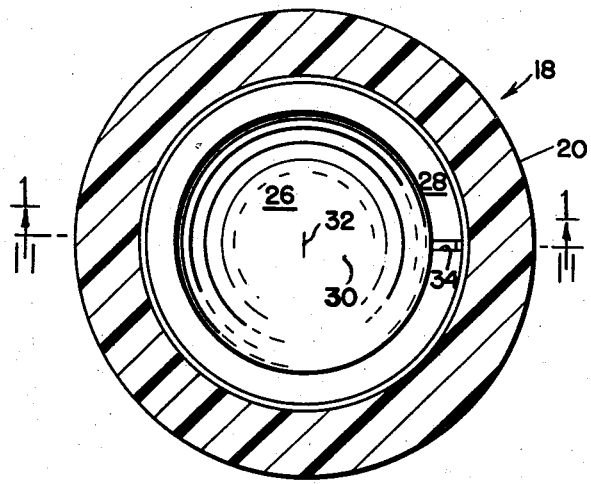

In the drawing:

FIGURE 1 is a fragmentary section taken on the line 1—1 of FIGURE 2 illustrating one embodiment of the present invention; and FIGURE 2 is a section taken on the line 2—2 of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, the present invention will be described in greater detail. The bottle 10 is a conventional type which is blown from suitable plastic material and has a neck 12 open at its upper end 14. Threads 16 are integrally formed on the outside of the neck 12. A suitable plastic cap 18 is fitted over the open upper end 14 for closing the same, and the cap 18 has a generally cylindrical portion 20 which is internally threaded as at 22 for receiving the threads 16 when the cap 18 is screwed onto the neck 12. The internal diameter of the cap 18 is slightly larger than the external diameter of the neck 12 so as to define a helical passageway 24 between the mating threads, which passageway 24 provides communication between the atmosphere and the upper, inner end of the cap 18, for a purpose to be described.

Seated on the upper end 14 of the neck 12 is a sealing member 26 which has an annular outer portion 28 and a central flexible diaphragm 30. The annular outer portion 28 is seated on the neck 12 and is engaged by the cap 18 when the latter is screwed fully onto the neck 12, so that an effective seal is then provided between the sealing member 26 and the upper end 14. The opening in the annular outer portion 28 is normally closed by the diaphragm 30.

As can be seen best in FIGURE 1, the diaphragm 30 is concave toward the open upper end 14 and convex toward the interior of the bottle 10. This inverted, slightly dome shape is an important feature of the present invention which aids in allowing "breathing" of the complete assembly at appropriate times. This is accomplished also in part by means of the thin slit 32 which extends axially through the center of the diaphragm 30, and the grooved upper and outer periphery at 34 of the annular portion 28, which groove 34 provides an extension of the passageway 24 to the space defined between the concave diaphragm 30 and the upper end of cap 18.

The slit 32 is normally closed, and in the event fluid pressures are exerted against the convex surface of the diaphragm 30, the resultant forces will place the diaphragm 30 in a state of compression tending further to keep the slit 32 closed. Thus, there will be no leakage of the fluid contents from the bottle 10 even if the same should be inverted during shipping, storing or handling. The slit 30 will always remain closed so long as the fluid pressures acting on the convex side of the diaphragm are equal to or exceed the fluid pressures acting on the concave side of the diaphragm 30. The fluid pressures that will act on the concave side of the diaphragm 30 will generally be the same as the atmospheric air pressure, and therefore, for the present purposes, may be considered to be substantially constant. However, in the event the liquid contents within the bottle 10 have an affinity for oxygen, the oxygen in the air which has been sealed within the bottle 10 will unite with such liquid resulting in a reduction of pressure within the bottle 10. Under these circumstances the fluid pressure on the concave side of the diaphragm 30 will exceed the fluid pressures on the convex side of diaphragm 30, and by virtue of the inverted, slightly dome shape of the diaphragm 30, the latter will then be in a state of tension causing the slit 32 to open. This will then permit the bottle to "breathe" in air via the passageway 24 and the slit 32 until the pressure within the bottle 10 corresponds to the atmospheric pressure, at which time the slit 32 will again close.

From the foregoing it can be understood that a very simple sealing member 26 is provided which is made of suitable plastic material at low cost. It is completely automatic in its operation so that if reduced pressures occur within the bottle 10, air from the atmosphere can be leaked theretinto to equalize the pressures within the bottle and of the surrounding atmosphere. Thus, there will be no partial collapsing of the bottle 10, as would otherwise occur. Furthermore, the construction of the sealing member 26 is such that even if the bottle 10 is inverted so that the liquid engages the sealing member 26, the static pressure head of the liquid will maintain the slit 32 closed, thereby preventing leakage.

Having thus described my invention, I claim:

1. A sealed container assembly adapted to permit air to enter the container when the fluid pressure within the container is less than the pressure of the surrounding air, comprising a container having an externally threaded neck open at its upper end, a cap having an internally threaded generally cylindrical closed upper end screwed onto said externally threaded neck, the portions of said cap and said neck between their connected threads being spaced apart to provide a passageway from the surrounding air into the cap to said closed end, and a sealing member having an annular portion held between said neck and said cap in sealing relation on the upper end of said neck and a flexible concave diaphragm closing said annular portion, said annular portion being thicker in an axial direction than said diaphragm so as to provide a raised shoulder above the upper surface of the diaphragm, said annular portion having a generally radially extending groove in the upper surface of said shoulder providing communication between said passageway and the space between said diaphragm and the closed end of said cap, said diaphragm having a short slit at its axis providing when open communication between said space above the diaphragm and the interior of the container, the concave shape of said diaphragm being such that when fluid pressure on the upper side of the diaphragm is greater than on the lower side the slit will open and when the fluid pressure on the lower side is greater than the fluid pressure on the upper side the slit will be urged closed.

2. In combination, a bottle having a neck open at its upper end, a cap removably secured on said neck for closing said upper end, and a sealing member positioned between said upper end and said cap for sealing the contents of the bottle therein, said sealing member having an outer portion conforming generally to the shape of said upper end so that a fluid seal exists therebetween when said cap is secured on said neck, said sealing member having a central flexible diaphragm which is convex with respect to the interior of the bottle so that when the fluid pressure exerted on the convex side of the diaphragm is relatively greater than on the opposite concave side the diaphragm will be in a state of compression and when fluid pressure exerted on the concave side is relatively greater than on the convex side the diaphragm will be in a state of tension, said diaphragm having a normally closed aperture therein which is adapted to open when said diaphragm is in a state of tension, and the outer portion of said sealing member having a radial groove to define a passageway communicating between the atmosphere and the space between said cap and said diaphragm.

3. A sealing member for use with a collapsible plastic bottle having a removable cap, comprising an outer generally annular portion adapted to seat on the open end of the bottle and a central flexible diaphragm closing the opening in said generally annular portion, said diaphragm having an inverted generally dome-shape and having a thin slit extending axially through its center, said annular portion being thicker in an axial direction than said diaphragm so as to provide a raised shoulder above the upper surface of the diaphragm, said raised shoulder defining a radially extending passageway therethrough.

4. A sealing member for use with a collapsible plastic bottle having a removable cap, comprising an outer generally annular portion adapted to seat on the open end of the bottle and a central flexible diaphragm closing the opening in said generally annular portion, said diaphragm having an inverted generally dome-shape and having a thin slit extending axially through its center, said annular portion having a radially extending groove on its upper side to provide a passageway for air from an external source to the space defined in part by the concave side of said diaphragm.

5. A sealing member for use with a bottle having a removable cap, comprising an outer generally annular portion adapted to seat on the open end of the bottle and a central flexible diaphragm closing the opening in said generally annular portion, said diaphragm being normally convex to the side of the annular portion adapted to seat on said bottle so that when the fluid pressure exerted on the convex side of the diaphragm is relatively greater than on the opposite concave side the diaphragm will be a state of compression and when fluid pressure exerted on the concave side is relatively greater than on the convex side the diaphragm will be in a state of tension, said diaphragm having a normally closed aperture therein which is adapted to open when said diaphragm is in a state of tension, said annular portion being thicker in an axial direction than said diaphragm so as to provide a raised shoulder above the upper surface of the diaphragm, said raised shoulder defining a radially extending passageway therethrough.

References Cited in the file of this patent

UNITED STATES PATENTS 2,254,815    Barnby _____ Sept. 2, 1941

FOREIGN PATENTS 638,279    Germany _____ Nov. 12, 1936